(12) United States Patent
Biskeborn et al.

(10) Patent No.: US 11,615,807 B1
(45) Date of Patent: Mar. 28, 2023

(54) FLAT PROFILE TAPE RECORDING HEAD HAVING BEVELED NON-FUNCTIONAL PORTIONS

(71) Applicant: Western Digital Technologies, Inc., San Jose, CA (US)

(72) Inventors: Robert G. Biskeborn, Hollister, CA (US); Oscar J. Ruiz, San Jose, CA (US); Kenji Kuroki, Fujisawa (JP); Michael T. Babin, Sr., Saratoga, CA (US); Eduardo Torres, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/657,248

(22) Filed: Mar. 30, 2022

(51) Int. Cl.
*G11B 5/127* (2006.01)
*G11B 5/008* (2006.01)
*G11B 5/48* (2006.01)
*G11B 5/78* (2006.01)

(52) U.S. Cl.
CPC ........ *G11B 5/1272* (2013.01); *G11B 5/00878* (2013.01); *G11B 5/4893* (2013.01); *G11B 5/78* (2013.01)

(58) Field of Classification Search
None
See application file for complete search history.

(56) References Cited

U.S. PATENT DOCUMENTS

| | | | | |
|---|---|---|---|---|
| 3,821,813 A | * | 6/1974 | Freeman et al. ........ | G11B 15/61 360/291.6 |
| 5,475,553 A | * | 12/1995 | Saliba ................... | G11B 5/105 |
| 5,905,613 A | | 5/1999 | Biskeborn et al. | |
| 6,972,931 B2 | * | 12/2005 | Rudi ....................... | G11B 5/584 |
| 8,373,944 B2 | * | 2/2013 | Biskeborn .......... | G11B 5/00826 360/110 |
| 8,958,175 B1 | | 2/2015 | Lakshmikumaran et al. | |
| 8,964,319 B1 | | 2/2015 | Biskeborn et al. | |
| 9,449,619 B1 | * | 9/2016 | Biskeborn ............ | G11B 5/1871 |
| 10,657,989 B1 | | 5/2020 | Biskeborn et al. | |
| 10,902,868 B2 | | 1/2021 | Biskeborn et al. | |

(Continued)

FOREIGN PATENT DOCUMENTS

EP 0913811 A1 5/1999

OTHER PUBLICATIONS

"Magnetic Tape," Magnetic Tape—an Overview | ScienceDirect Topics, 2021, ScienceDirect, accessed Sep. 28, 2021, 16 pages, https://www.sciencedirect.com/topics/materials-science/magnetic-tape.

(Continued)

*Primary Examiner* — William J Klimowicz
(74) *Attorney, Agent, or Firm* — Patterson + Sheridan, LLP; Steven H. VerSteeg

(57) ABSTRACT

The present disclosure is generally related to a tape head assembly narrower than the width of a tape, wherein the tape head assembly comprises one or more heads, wherein each of the one or more heads comprise a curved surface comprising a first beveled wing, a second beveled wing, and a flat-lapped surface disposed between the first beveled wing and the second beveled wing. The first beveled wing and the second beveled wing each comprise outer corners recessed from a top surface of the flat-lapped surface such that there is no interaction between the outer corners of the beveled wings and the tape.

19 Claims, 11 Drawing Sheets

(56) References Cited

U.S. PATENT DOCUMENTS

| | | | | |
|---|---|---|---|---|
| 2002/0141112 | A1* | 10/2002 | Saliba | G11B 5/10 |
| | | | | 360/129 |
| 2010/0196739 | A1* | 8/2010 | Hachisuka | G11B 5/0083 |
| | | | | 360/110 |
| 2012/0300338 | A1* | 11/2012 | Biskeborn | G11B 5/60 |
| | | | | 360/75 |
| 2015/0194173 | A1* | 7/2015 | Dellmann | G11B 5/255 |
| | | | | 360/75 |
| 2019/0178955 | A1* | 6/2019 | Biskeborn | G11B 5/00821 |
| 2019/0287555 | A1* | 9/2019 | Biskeborn | G11B 5/60 |
| 2020/0020354 | A1* | 1/2020 | Biskeborn | G11B 5/29 |

OTHER PUBLICATIONS

Engelen et al. "Flat-Profile Tape-Head Friction and Magnetic Spacing." IEEE Transactions on Magnetics, vol. 50, No. 3, Mar. 2014, pp. 34-39.

* cited by examiner

FLAT PROFILE TAPE RECORDING HEAD HAVING BEVELED NON-FUNCTIONAL PORTIONS

BACKGROUND OF THE DISCLOSURE

Field of the Disclosure

Embodiments of the present disclosure generally relate to a tape head assembly with beveled wings for magnetic storage devices, such as magnetic tape drives.

Description of the Related Art

In a tape drive system, a magnetic tape is configured to pass over a media facing surface (MFS) of a head at a high speed. In order to effectively write and read to the tape, the spacing between the tape and the MFS surface of the head must be minimized. Ideally, the tape travels smoothly across the MFS of the head; however, sharp corners on the head can cause the tape to kink or tear, damaging the tape.

One approach for preventing damage to the tape are heads configured to be wider than the tape so that the tape does not contact the corners of the head, such as traditional linear tape-open (LTO) drives. However, this approach limits the size of the tape and the tape heads that can be used. Another approach for preventing damage to the tape is a head where the ends are angled away from the tape at a significant angle such as 20 degrees or more such that there is no contact or air bearing between the tape and the head towards the edge of the head. However, this approach may still kink or tear the tape because the sharply angled ends provide no support for the tape and a harsh edge is still created between a flat portion of the head and the angled ends.

Therefore, there is a need in the art for a head narrower than the width of the tape that allows for minimal spacing between the head and the tape without causing damage to the tape.

SUMMARY OF THE DISCLOSURE

The present disclosure is generally related to a tape head assembly narrower than the width of a tape, wherein the tape head assembly comprises one or more heads, wherein each of the one or more heads comprise a curved surface comprising a first beveled wing, a second beveled wing, and a flat-lapped surface disposed between the first beveled wing and the second beveled wing. The first beveled wing and the second beveled wing each comprise outer corners recessed from a top surface of the flat-lapped surface such that there is no interaction between the corners of the beveled wings and the tape.

In one embodiment, a tape head, comprising: a tape head body having a curved surface disposed at a media facing surface (MFS), wherein the curved surface comprises: a flat-lapped surface; and a first beveled wing extending from the flat-lapped surface, wherein the first beveled wing includes a first corner and a second corner, wherein the first corner and the second corner are connected by a first arched edge.

In another embodiment, tape head assembly comprising: a first module comprising: a first substrate; and a first curved surface disposed on the first substrate, wherein the first curved surface comprises: a first portion disposed in contact with a media facing surface (MFS); and a second portion recessed from a top surface of the first portion; and a second module comprising: a second substrate; and a second curved surface disposed on the second substrate, wherein the second curved surface comprises: a third portion disposed in contact with the MFS; and a second portion recessed from a top surface of the third portion, wherein the first curved surface is spaced a first distance away from the second curved surface, wherein the first distance is parallel to the MFS.

In yet another embodiment, a tape head, comprising: a tape head body having a curved surface disposed at a media facing surface (MFS), wherein the curved surface comprises: a first layer having a first end and a second end each extending from a flat central portion, wherein each of the first end and the second end are arched; a second portion, wherein the second portion is identical to the first portion; and a recording gap disposed between the first portion and the second portion.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of the disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a tape head assembly narrower than the width of a tape, wherein the tape head assembly comprises one or more heads, wherein each of the one or more heads comprise a curved surface comprising a first beveled wing, a second beveled wing, and a flat-lapped surface disposed between the first beveled wing and the second beveled wing. The first beveled wing and the second beveled wing each comprise outer corners recessed from a top surface of the flat-lapped surface such that there is no interaction between the outer corners of the beveled wings and the tape.

Figure 1A:
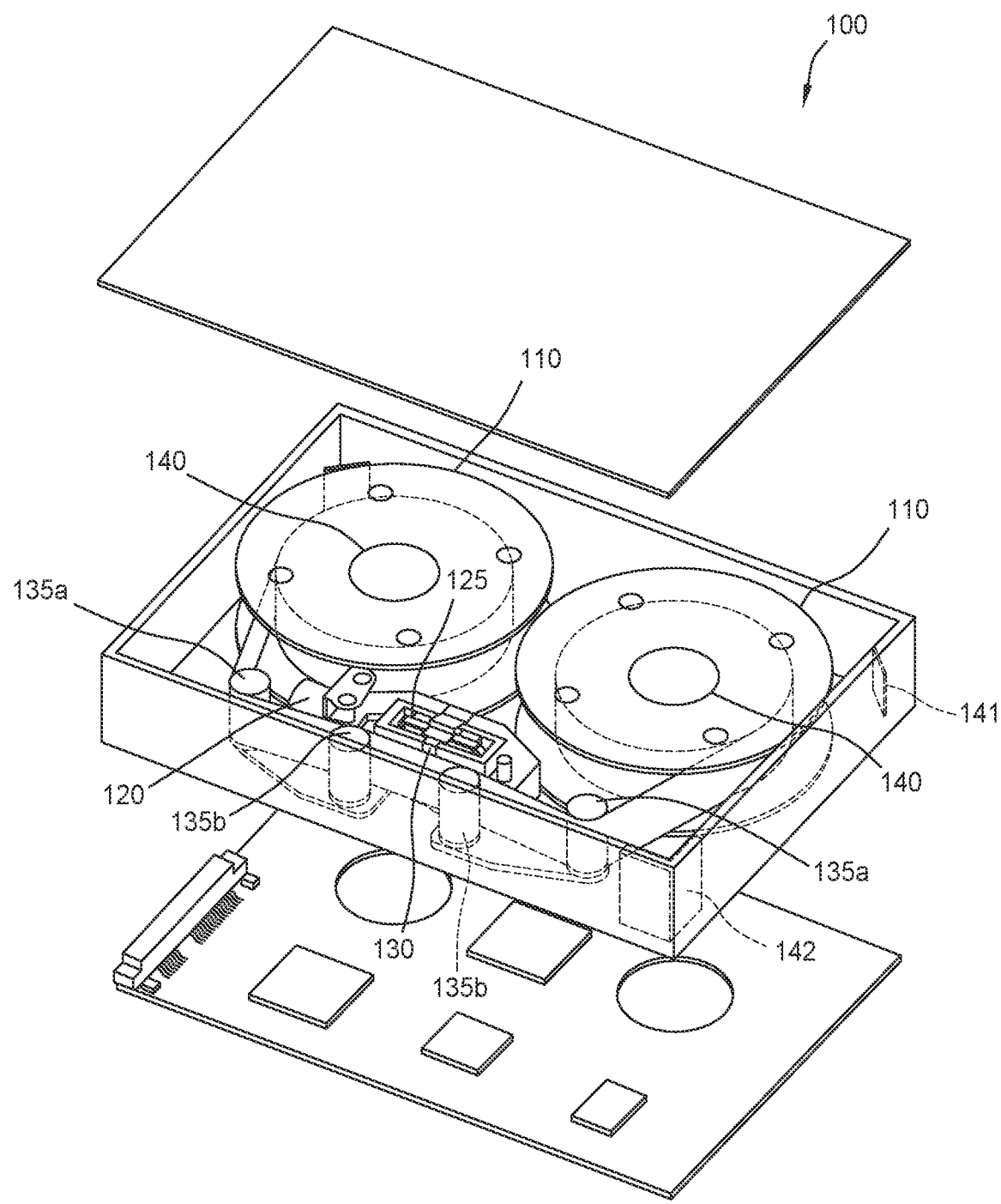
FIGS. 1A-1C illustrate a perspective exploded view, a simplified top down view, and a side profile view of a tape drive, in accordance with some embodiments.
Figure 1B:
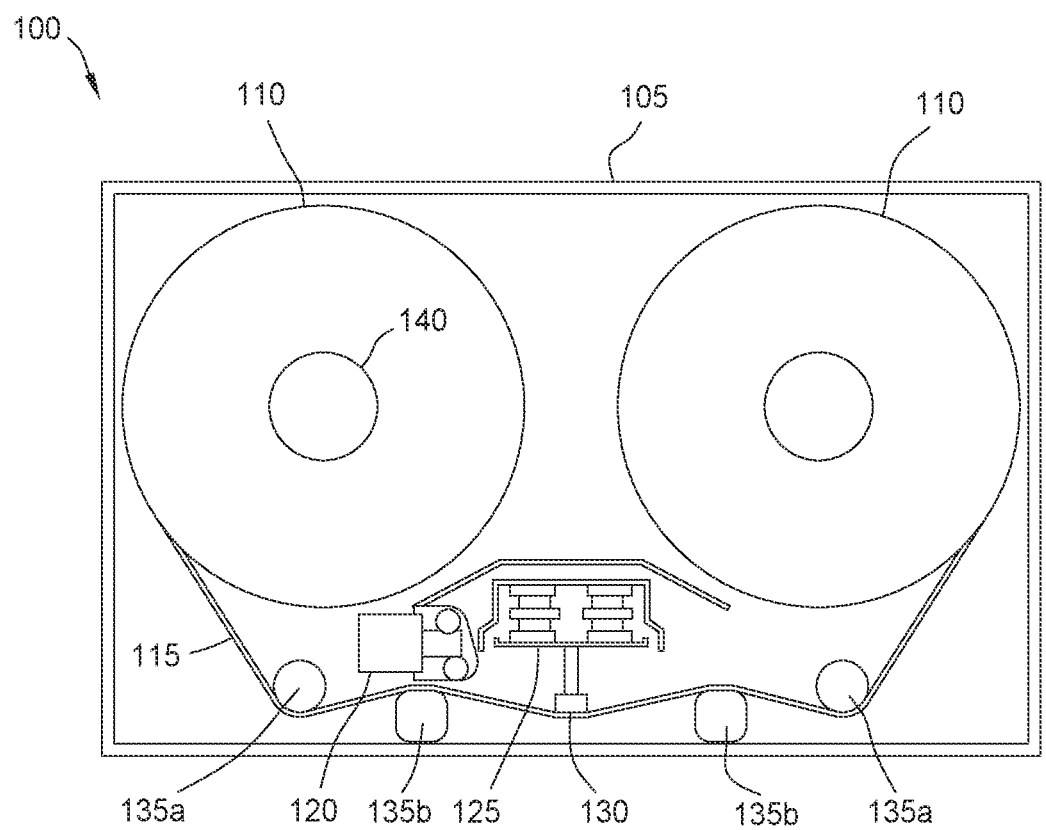
Figure 1C:
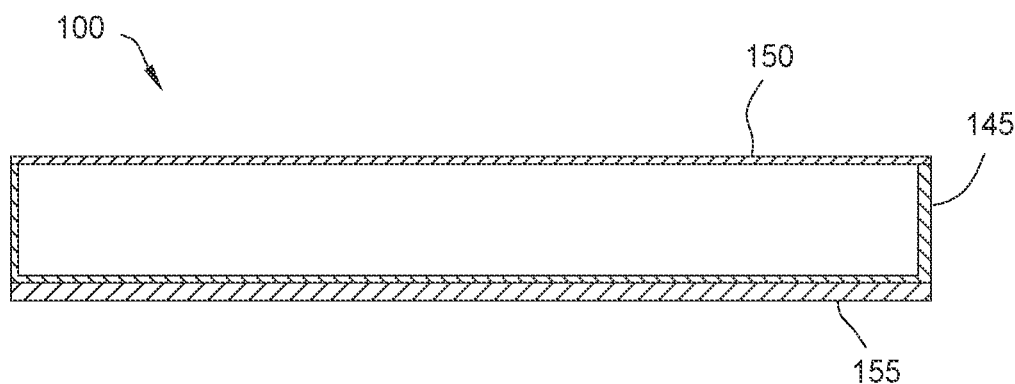

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more spindles 140 coupled to the one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles 140 of the tape reels 110 can operate to wind and unwind the tape media 115 in the tape reels 110. Each tape reel 110 may also incorporate a tape folder to help the tape media 115 be neatly wound onto the tape reel 110. One or more of the tape reels 110 may form a part of a removable cartridge and are not necessarily part of the tape drive 100. In such embodiments, the tape drive 100 may not be a tape embedded drive as it does not have embedded media, the tape drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or the tape media 115 is contained in a cartridge that is removable from the tape drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the tape reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s).

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the tape drive 100 may be hermetically sealed for environmental control by attaching (e.g., laser welding, adhesive, etc.) the cover 150 to the base 145. The tape drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the particle filters 141 and/or the desiccant 142 may be left out.

In various embodiments, the tape drive 100 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading of written data, as well as control of the tape head and media to achieve the same, may be controlled by the controller. As an example, the controller may be configured to move the read and write heads as described below.

Figure 2:
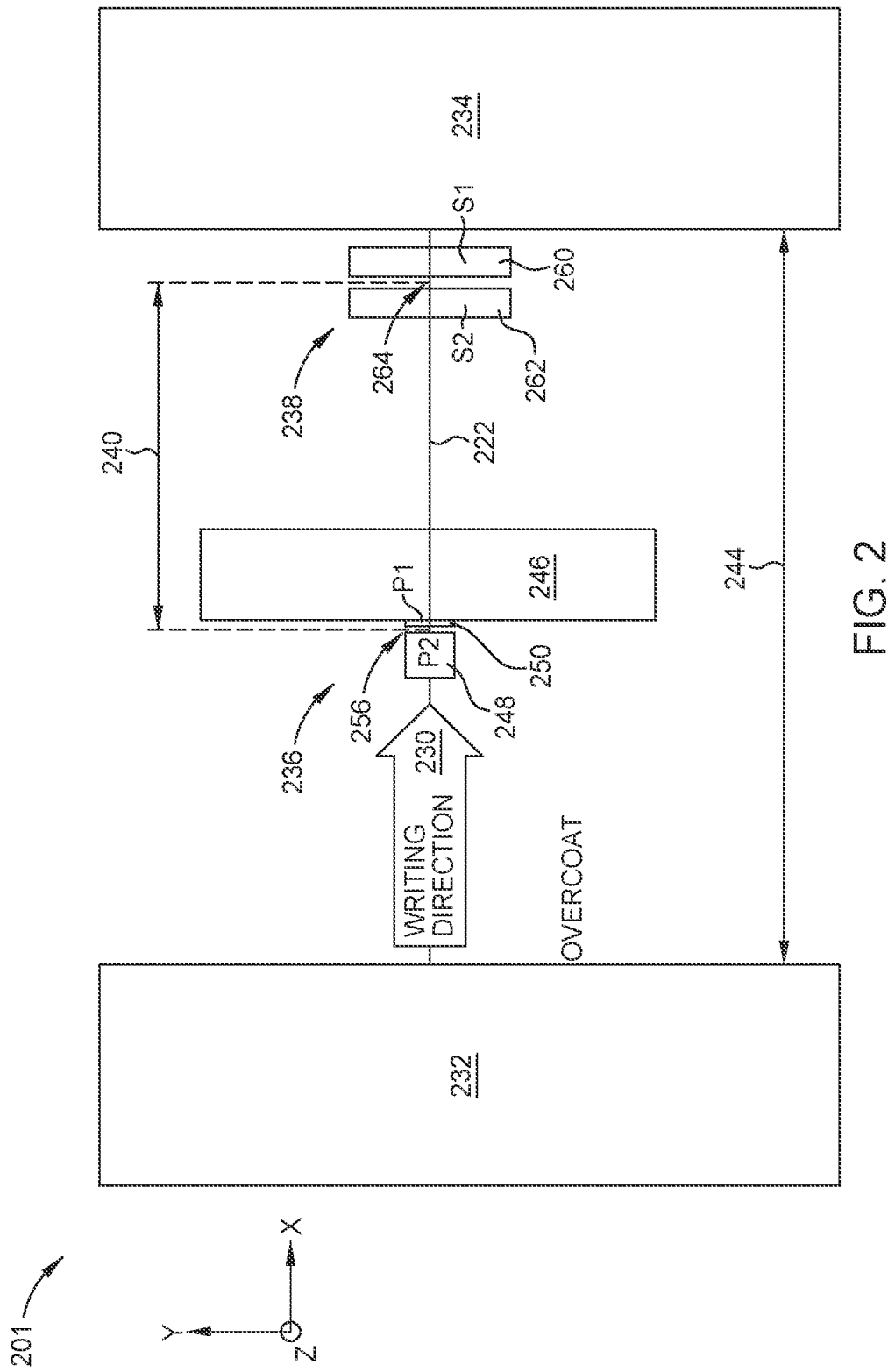
FIG. 2 illustrates a media facing surface (MFS) view of a data head assembly, according to one embodiment.

FIG. 2 illustrates a MFS view of a data head assembly 201, according to one embodiment. The data head assembly 201 may be utilized within a tape drive comprising a controller, such as the tape drive 100 of FIG. 1A.

The data head assembly 201 comprises a closure 232, one or more write transducers 236 disposed adjacent to the closure 232, one or more read transducers 238 disposed adjacent to the one or more write transducers 236, and a substrate 234 disposed adjacent to the one or more read transducers 238. Each of the one or more write transducers 236 and the one or more read transducers 238 are disposed on the substrate 234. The write transducer(s) 238 may be referred to as a writer(s) 236, and the read transducers may be referred to as a reader(s) 238.

For simplicity of illustration, only one writer 236 and one reader 238 pair is shown in FIG. 2. The data head assembly 201 may comprise a plurality of writer 236 and reader 238 pairs, which may be referred to as a head array.

A writer 236 is spaced a distance 240 from a reader 238 of about 5 µm to about 20 µm, such as about 5 µm to about 15 µm. In embodiments comprising a plurality of writer 236 and a plurality of reader 238 pairs, each writer 236 is spaced a distance 240 from an adjacent paired reader 238. The closure 232 is spaced a distance 244 from the substrate 234 of about 20 µm to about 100 µm.

Each of the writers 236 comprises a first write pole P1 246 and a second write pole P2 248. A notch 250 is disposed on the P1 246. The notch 250 is disposed adjacent to a write gap 256, where the P1 246 is spaced from the P2 248 by a distance in the x-direction at least twice the length of the write gap 256. Each of the readers 238 comprises a first shield S1 260, a second shield 262, and a magnetic sensor 264 disposed between the S1 260 and the S2 262. The magnetic sensor 264 may be a tunnel magnetoresistance (TMR) sensor, for example. The write gap 256 and the magnetic sensor 264 are aligned or centered upon a center axis 222 in the y-direction such that the center axis 222 is aligned with a centerline of the magnetic sensor 264. In some embodiments, the distance 240 is measured from the write gap 256 to an MgO layer (not shown) of the magnetic sensor 264.

When writing data to a tape or other media, the tape moves over the writer 236 in the writing direction 230 (i.e., in the x-direction). Due to at least in part to the distance 240 between the write gap 256 and the magnetic sensor 264 of a writer 236 and a reader 238 pair, in some embodiments, the writer 236 is able to write to the media, and the reader 238 is able to read the data to verify the data was written correctly. Thus, the writer 236 is able to write data to a portion of the tape, and the paired reader 238 is able to read verify the newly written portion of the tape immediately. As such, the data head assembly 201 is able to write data to and read verify data from a tape concurrently.

The data head assembly 201 is able to concurrently write and read data due in part to the distance 240 between the write gap 256 and the magnetic sensor 264 of a writer 236 and reader 238 pair. The write gap 256 and magnetic sensor 264 are spaced far enough apart that the amplitude of signals in the reader 238 that arise from coupling of magnetic flux from the paired writer 236 is reduced or substantially less than the readback signal of the reader 238 itself. By spacing the writer 236 from the reader 238 by the distance 240, and by adjusting magnetic design parameters, such as magnetic shield dimensions, write transducer coil design, and optionally deploying additional shielding between the read and write transducers 238, 236, a ratio of read signal to coupled writer signal amplitudes greater than about 30 dB may be achieved.

As used herein, the data head assembly 201 being able to "concurrently" write and read data refers to the fact that both the writer 236 and the reader 238 are concurrently turned "on" or able to operate simultaneously with respect to various data written to the tape. However, it is to be noted that the writer 236 and the reader 238 are not "concurrently" operating on the same data at the same time. Rather, the writer 236 first writes data, and as the tape moves over the reader 238, the reader 238 is then able to read verify the newly written data as the writer 236 concurrently writes different data to a different portion of the tape. Furthermore, it is to be noted that a controller (not shown) is configured to independently operate both the writer 236 and the reader 238. Thus, while the writer 236 is described as writing data and the reader 238 is described as reading the data, the controller enables the writer 236 to write and enables the reader 238 to read. It is noted that while not shown, a "reversed" version of the data head assembly 201 is possible (where the writing direction goes in the −X direction), and the elements are flipped accordingly. For example, a reversed version may be combined in a "forward" version in FIG. 2 in a two module configuration such as that shown below in FIG. 7.

Figure 3:
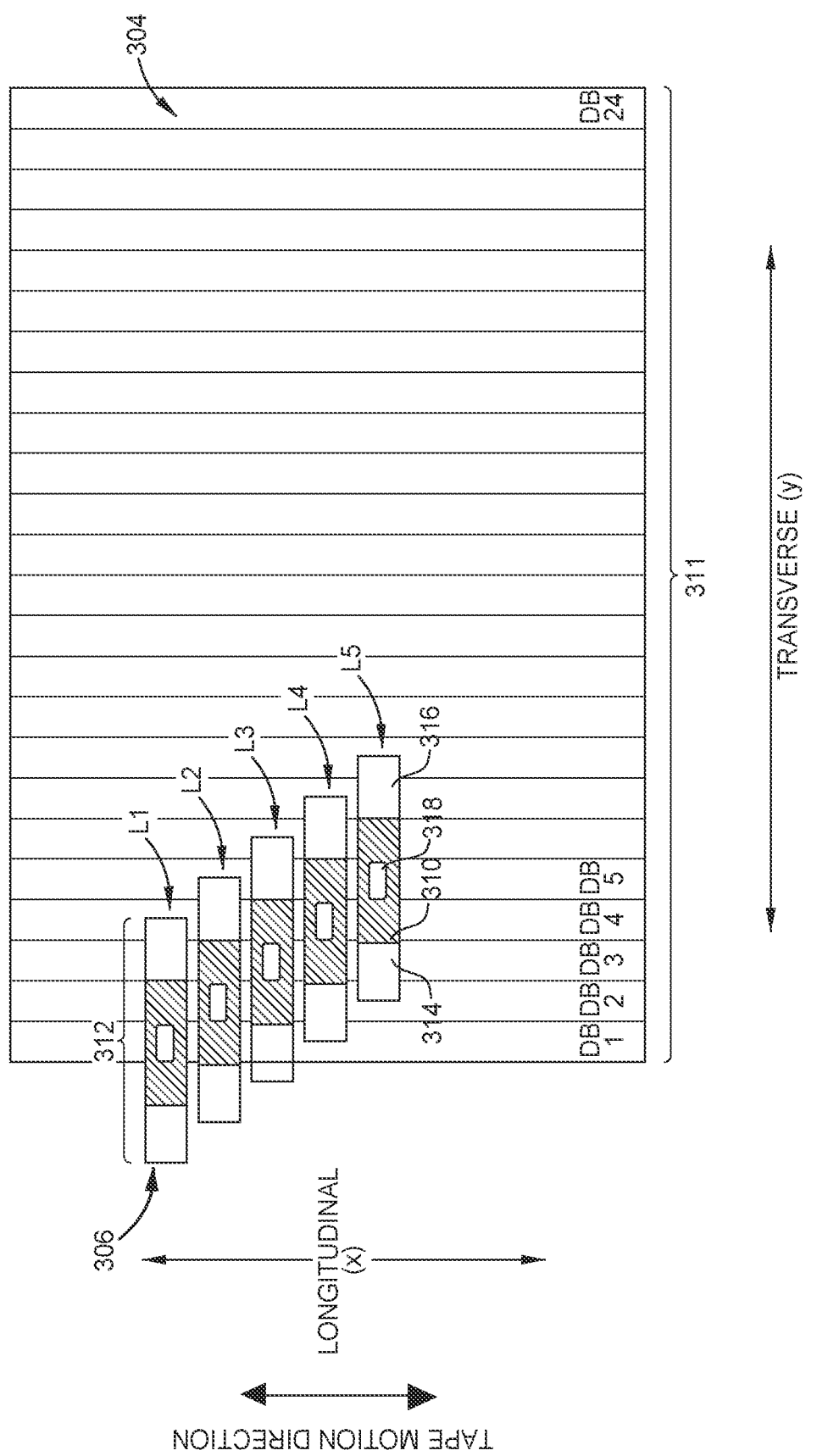
FIG. 3 illustrates a schematic of a tape head and a tape according to one embodiment.

FIG. 3 illustrates a schematic of a head and a tape according to one embodiment. A tape 304 is configured to pass over the head 306. It is to be understood that although the head 306 is illustrated as disposed over the tape 304, this is merely for illustrative purposes to show a relative position of the tape 304 to the head 306. The head 306 may be the data head assembly 201 of FIG. 2. The head 306 may be within a storage device, such as the tape drive 100 of FIG. 1A.

The head 306 comprises a flat-lapped surface 310, wherein a recording gap 318 is disposed within the flat-lapped surface. The recording gap may contain a plurality of readers and writers (not shown), such as described in FIG.

2. For example, the recording gap 318 may contain eight or sixteen pairs of readers and writers. However, it is to be understood that the head 306 may contain any number of pairs of readers and writers. The head 306 further comprises a first beveled wing 314 disposed on one end of the flat-lapped surface 310, and a second beveled wing 316 disposed on an opposite end of the flat-lapped surface 310.

During operation, the tape 304 passes across the head 306 in the longitudinal direction, and the head 306 moves across the width of the tape in the transverse direction, thereby permitting the head 306 to write data to data bands 1-24 of the tape 304 and/or read data from the tape 304. Each data band comprises a plurality of data tracks. Thus, the recording elements may span a plurality of data tracks. This is illustrated by locations L1-L5 which show various locations of the head 306 relative to the tape 304.

At a first location L1 the tape 304 is positioned so that the head 306 can write and/or read a first data band DB1. As the head 306 moves in the transverse direction successive data bands are written to/read from, as represented by locations L2-L5. At location L2 the head 306 is positioned to read/write to a second data band DB2. At location L3 the head 306 is positioned to read/write to a third data band DB3. At location L4 the head 306 is positioned to read/write to a fourth data band DB4. At location L5 the head 306 is positioned to read/write to a fifth data band DB5. It is to be understood that although the tape 304 is shown comprising 24 data bands, the tape 304 may comprise more or less data bands according to the embodiment.

As discussed above, it is important to minimize the spacing between the head 306 and the tape 304 because the read/write head(s), such as the writer(s) 236 and the reader(s) 238 of FIG. 2, must be in close proximity to the tape 304. Thus, ideally the tape 304 travels smoothly across the width of the head 306 so that data can be effectively written to/read from the tape 304. However, as illustrated in FIG. 3, the tape 304 has a first width 311 larger than a second width 312 of the head 306. Therefore, as the tape 304 contacts the media facing surface (MFS) of the head 306, a contact pressure forms, wherein the contact pressure is greatest at the corners and boundary of the head 306. This contact pressure at the corners and boundary may wear or tear the tape, thereby damaging the tape and negatively impacting reading/writing performance. Therefore, by angling the corners and edges of the head 306 away from the MFS of the head 306 the contact pressure at the corners and boundary can be alleviated. However, if the corners fall away from the MFS of the head 306 at too large of an angle, the ends of the head 306 provide little to no support for the tape 304 and a high contact pressure is still created.

Thus it is beneficial, as discussed herein, to design the head 306 where the corners are recessed from a top surface of the head 306 by only a few microns, thereby creating a shallow head profile so that the tape 304 is supported by the head 306 and able to fly above the head 306 with a spacing of only about 300 nanometers (nm) to about 1 micrometer (μm) without damaging the tape 304.

Figure 4:
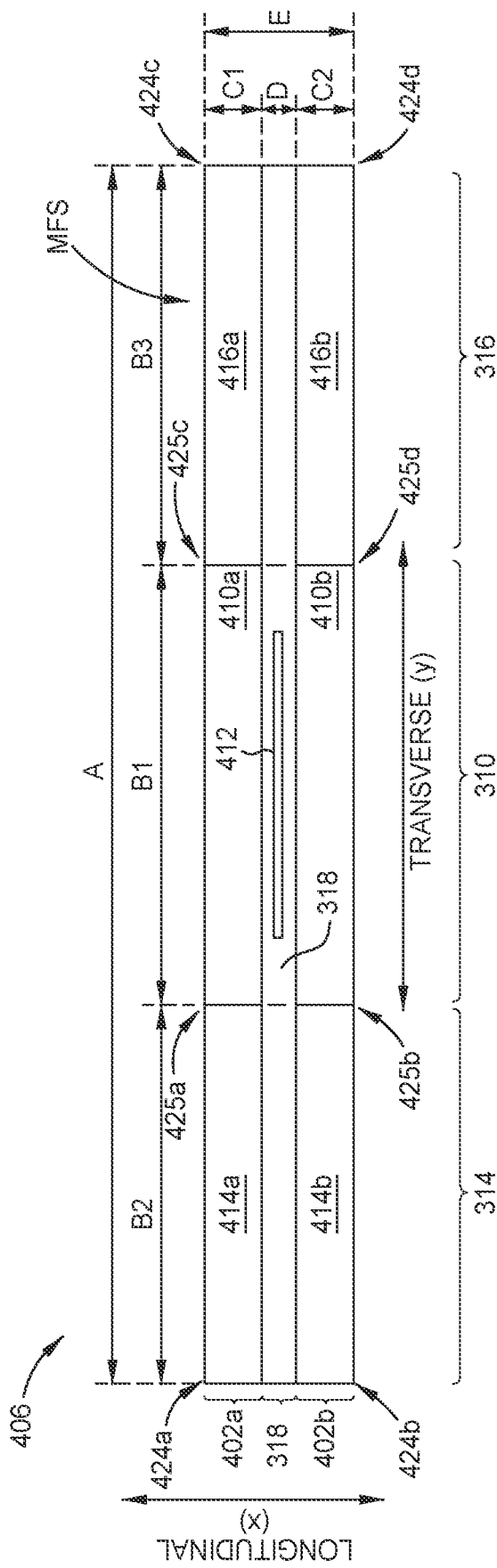
FIG. 4 illustrates a MFS view of a single tape head having beveled corners according to one embodiment.

FIG. 4 illustrates a MFS view of a head 406 having beveled corners. The head 406 may be the head 306 of FIG. 3. The head 406 may be within a storage device, such as the tape drive 100 of FIG. 1A. The head 406 comprises a curved MFS having a first layer 402a of a wafer disposed at the MFS, a second layer 402b of the wafer disposed at the MFS, wherein the second layer 402b is further disposed adjacent to the first layer 402a, and the recording gap 318 is disposed between the first layer 402a and the second layer 402b in the longitudinal direction. The curved aspect of the MFS will be explained further with the description of the bevel wings below. The recording gap 318 comprises a recording element 412. It is to be understood that although the recording gap 318 is shown as spanning the width A of the head 406, the recording gap 318 may have a shorter width such that it does not span the width A.

The first layer 402a and the second layer 402b are identical, as such the first layer 402a has a first length C1 of about 50 μm to about 150 μm in the longitudinal direction, and the second layer 402b has a second length C2 equal to the first length C1. The recording gap 318 has a third length D of about 20 μm to about 100 μm in the longitudinal direction. Thus, the head 406 has a fourth length E of about 120 μm to about 400 μm in the longitudinal direction.

The first layer 402a comprises a first portion 410a of a flat-lapped surface 310, a first portion 414a of a first beveled wing 314, and a first portion 416a of a second beveled wing 316, and the second layer 402b comprises a second portion 410b of the flat-lapped surface 310, a second portion 414b of the first beveled wing 314, and a second portion 416b of the second beveled wing 316. The first portion of the flat-lapped surface 410a and the second portion of the flat-lapped surface 410b comprise the flat-lapped surface 310 of FIG. 3. The first portion of the first beveled wing 414a and the second portion of the first beveled wing 414b comprise the first beveled wing 314 of FIG. 3. The first portion of the second beveled wing 416a and the second portion of the second beveled wing 416b comprise the second beveled wing 316 of FIG. 3. Together this configuration forms the curved MFS, in that the parts of beveled wings are curved away from the MFS, especially at the corners 424a-424d near the traverse edges of the head 406. Stated another way, portions of the wings are farther away from MFS, or recessed into the page in this FIG. 4 MFS view. A further illustration of the curved MFS will be provided in the three-dimensional view of FIGS. 5A-5E.

The flat-lapped surface 310 includes a recording element 412, wherein the recording element 412 comprises one or more pairs of a writer and/or reader such as the as the writer(s) 236 and the reader(s) 238 of FIG. 2. The flat-lapped surface 310 has a first width B1 of about 2 millimeters (mm) to about 4 mm, the first beveled wing 314 has a second width B2 of about 2 mm to about 3 mm, and the second beveled wing has a third width B3 equal to the second width B2. Thus, the head 406 has a width A of about 6 mm to about 10 mm. It is to be understood that the recording element 412 may not span the entire width of the recording gap 318. Further, each of the first beveled wing 314 and the second beveled wing 316 may start at about 0.1 mm to about 3.5 mm away from the recording elements (i.e. the inner corners delimiting the boundary between the flat-lapped surface 310 and the first and second beveled wings 314, 316, may be spaced 0.1 mm to about 3.5 mm away from the recording elements).

The first beveled wing 314 extends from a first side of the flat-lapped surface 310. The first beveled wing 314 is a non-function wing meaning that the wing does not contain recording elements. However, as discussed below, the first beveled wing 314 helps support a tape (not shown) configured to pass over the head 406, thereby permitting the head 406 to effectively read/write to the tape. The first beveled wing 314 comprises a first outer corner 424a and a second outer corner 424b, wherein the first outer corner 424a and the second outer corner 424b are disposed on an end of the first beveled wing 314 not connected to the flat-lapped surface 310. The first outer corner 424a is further disposed opposite the second outer corner 424b in the longitudinal direction. The first outer corner 424a and the second outer corner 424b are each recessed from a top surface of the flat-lapped surface 310 by a first distance, wherein the first distance is about 1 µm to about 10 µm. Thus, the first corner 424a and the second corner 424b do not contact the tape configured to pass over the head 406.

The first beveled wing further comprises a first inner corner 425a and a second inner corner 425b, wherein the first inner corner 425a and the second inner corner 425b are disposed on an end of the first beveled wing connected to the flat-lapped surface 310 (i.e. at the boundary between the first beveled wing 314 and the flat-lapped surface 310). The first inner corner 425a is further disposed opposite the second inner corner 425b in the longitudinal direction. The first inner corner 425a and the second inner corner 425b are each disposed at the MFS (i.e. on the same plane as the top surface of the flat-lapped surface 310). However, because the first outer corner 424a and the second outer corner 424b are recessed from the MFS, the contact pressure at first inner corner 425a and the second inner corner 425b is alleviated.

The second beveled wing 316 extends from a second side of the flat-lapped surface 310, wherein the second side of the flat-lapped surface 310 is opposite the first side of the flat-lapped surface 310. Similar to the first beveled wing 314, the second beveled wing 316 is a non-function wing meaning that the wing does not contain recording elements. However, as discussed below, the second beveled wing 316 helps support a tape (not shown) configured to pass over the head, thereby permitting the head 406 to effectively read/write to the tape. The second beveled wing 316 comprises a third outer corner 424c and a fourth outer corner 424d, wherein the third outer corner 424c and the fourth outer corner 424d are disposed on an end of the second beveled wing 316 not connected to the flat-lapped surface 310. The third outer corner 424c is further disposed opposite the fourth outer corner 424d in the longitudinal direction. The third outer corner 424c and the fourth outer corner 424d are recessed from the top surface of the flat-lapped surface 310 by a second distance, wherein the second distance is about 1 µm to about 10 µm. Thus, the third outer corner 424c and the fourth outer corner 424d do not contact the tape configured to pass over the head 406.

The second beveled wing further comprises a third inner corner 425c and a fourth inner corner 425d, wherein the third inner corner 425c and the fourth inner corner 425d are disposed on an end of the second beveled wing 316 connected to the flat-lapped surface 310 (i.e. at the boundary between the second beveled wing 316 and the flat-lapped surface 310). The third inner corner 425c is further disposed opposite the fourth inner corner 425d in the longitudinal direction. The third inner corner 425c and the fourth inner corner 425d are each disposed at the MFS (i.e. on the same plane as the top surface of the flat-lapped surface). However, because the third outer corner 424c and the fourth outer corner 424d are recessed from the MFS, the contact pressure at the third inner corner 425c and the fourth inner corner 425d is alleviated.

Figure 5A:
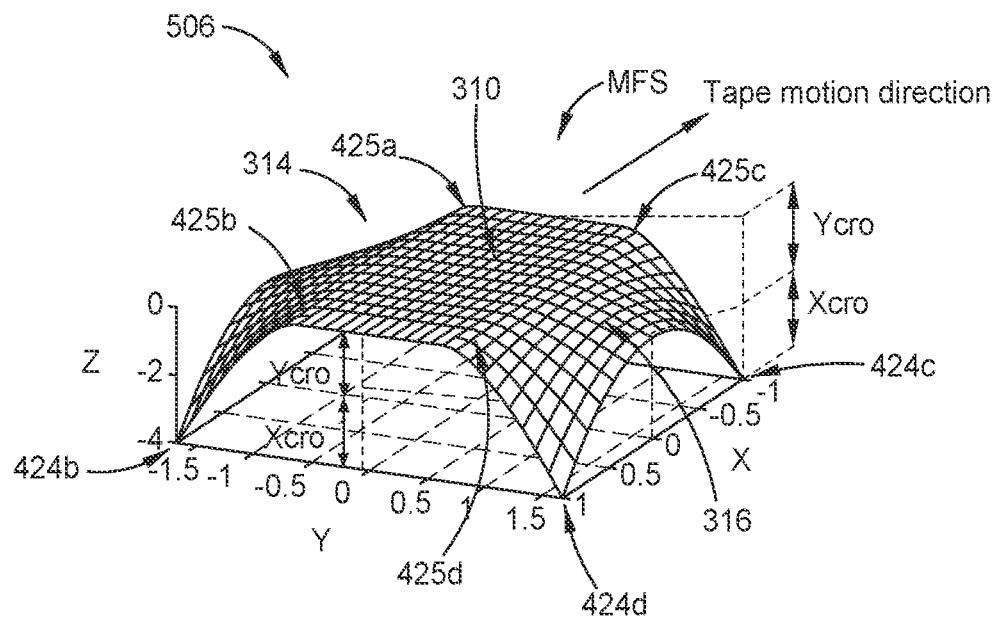
FIGS. 5A-5E illustrate three-dimensional head profiles of a single tape head having beveled corners, according to various embodiments.

FIG. 5A illustrates a three-dimensional schematic of a head 506. The head 506 may be the head 306 of FIG. 3, or the head 406 of FIG. 4. The head 506 comprises a flat-lapped surface 310 delimited by inner corners 425a-425d, a first beveled wing 314 delimited by the first inner corner 425a, the second inner corner 425b, the first outer corner 424a (not shown), and the second outer corner 424b, and a second beveled wing 316 delimited by the third inner corner 425c, the fourth inner corner 425d, the third outer corner 424c, and the fourth outer corner 424d. The flat-lapped surface and the inner corners 425a-425d are located on a first plane disposed at the MFS (z=0). The outer corners 424a-424d are located on a second plane below the first plane at z=−4. As such, the first beveled wing 314 comprises a first arch connecting the first outer corner 424a and the second outer corner 424b, and the second beveled wing comprises a second arch connecting the third outer corner 424c and the fourth outer corner 424d, wherein the first arch and the second arch each has a transverse crown height Xcro.

The first beveled wing 314 and the second beveled wing 316 are connected by a third arch and a fourth arch, wherein the third arch connects the first outer corner 424a and the third outer corner 424c, and wherein the fourth arch connects the second outer corner 424b and the fourth outer corner 424d. The third arch and the fourth arch each has a longitudinal crown height of Ycro, wherein Ycro is a distance between the flat-lapped surface 410 and the top of Xcro in the z-direction. The height, or distance between the outer and inner corners in the z-direction, is equal to −(Ycro+Xcro). As such, the curve of the profile of the head 506 is expressed by $(Xcro\ X^m + Ycro)Y^n$, wherein X is a non-dimensional value between −1 to 1, y is a non-dimensional value between 0.5 to 1.5, m is a first curvature power value between 2 and 3, and n is a second curvature value between 1.5 and 3. Each of the first beveled wing 314 and the second beveled wing 316 may have a slope of about 0.02 degrees)(°) to about 0.2° between the inner corners 425a-425d and the outer corners 424a-424d (i.g. the slope between the first inner corner 425a and the first outer corner 424a is between 0.02° and 0.2°).

It is to be understood that the scale of the z-axis has been exaggerated compared to the scale of the x-axis and the y-axis, and the longitudinal dimensions (x-axis) of the head 506 have been normalized to vary from −1 to +1 in the x-direction to better show the profile of the head 506.

By recessing the outer corners 424a-424d from the top surface of the flat-lapped surface 310 and creating beveled wings, a smooth head profile having no harsh edges is created. Thus, when a tape (not shown) configured to pass over the MFS of the head 506, the contact pressure at the inner corners 425a-425d and the outer corners 424a-424d is alleviated. It is to be understood that while the present embodiment illustrates a head 506 where the outer corners 424a-424d are recessed 4 µm from the MFS, this is only one possible embodiment. As discussed above, the outer corners 424a-424d may be recessed from the flat-lapped surface by various amounts depending on the embodiment. As such, by varying the distance that the outer corners 424a-424d are recessed from the top surface of the flat-lapped surface, the longitudinal crown height Xcro, the transverse crown height Ycro, and the overall head profile are impacted. Therefore, a certain distance that the outer corners 424a-424d are recessed from the flat-lapped surface can be chosen to achieve the desired head profile.

Figure 5B:
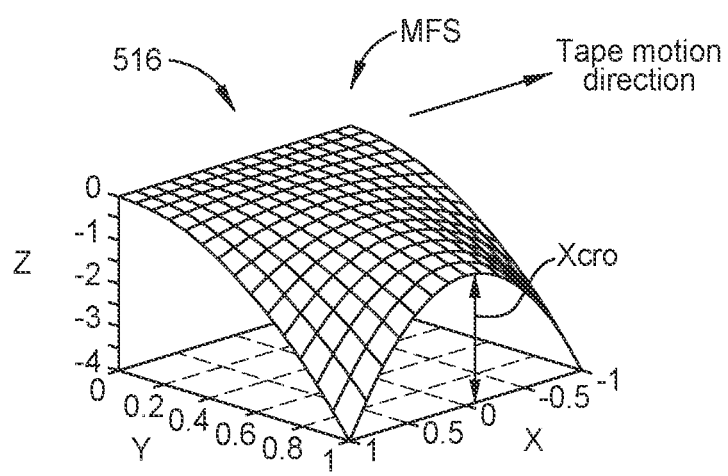
Figure 5C:
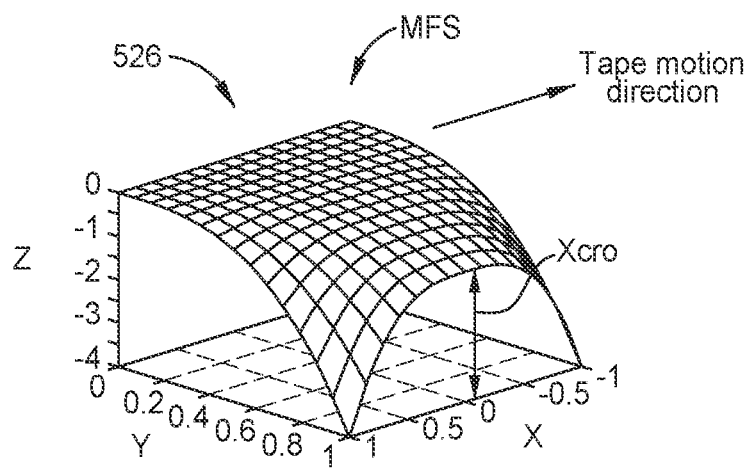
Figure 5D:
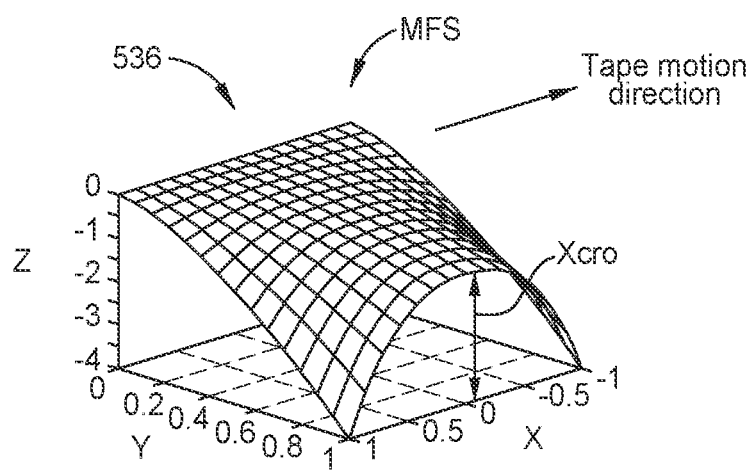

FIGS. 5B-5D illustrate how adjusting the first curvature power value m and the second curvature power value n impacts the longitudinal crown height Xcro. For illustrative purposes FIGS. 5B-5D only show a portion of the head profile. Similar to FIG. 5A, here the x-axis has been normalized to vary from −1 to +1 in the x-direction to better show the head profiles. Additionally, here the longitudinal dimension (y-axis) has been normalized to vary from 0 to 1 in the y-direction to better show the head profiles.

FIG. 5B illustrates a portion of the profile of a head 516 where the first curvature power value m is equal to 2 and the second curvature power value n is equal to 2. FIG. 5C illustrates a portion of the profile of a head 516 where the first curvature power value m is equal to 3 and the second curvature power value n is equal to 3. FIG. 5D illustrates a portion of the profile of a head 516 where the first curvature power value m is equal to 2.5 and the second curvature power value n is equal to 1.5. In each of FIGS. 5B-5D, the third outer corner 424c and the fourth outer corner 424d are recessed 4 μm from the flat-lapped surface. Thus, the longitudinal crown height Xcro stays constant. However, as illustrated, the shape of the second arch between the third outer corner 424c and the fourth outer corner 424d changes. Therefore, by adjusting the first curvature power value m and the second curvature power value n, a desired head profile can be achieved without having the alter the distance that the outer corners 424a-424d are recessed from the flat-lapped surface.

Figure 5E:
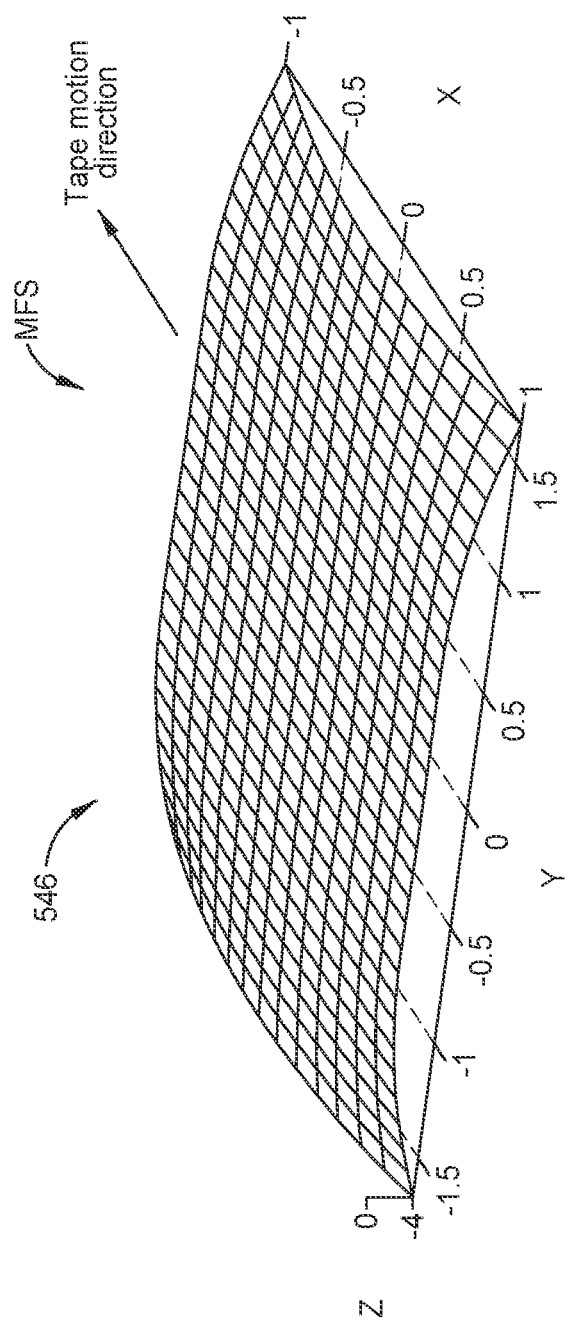

FIG. 5E illustrates a three-dimensional profile a head 546 where the first curvature power value m is equal to 2 and the second curvature power value n is equal to 2 (i.e. the same values as FIG. 5B); however, here the scale of the z-axis has not been exaggerated. Thus, it can be seen that the profile of head 546 is relatively flat with no harsh corners. It is this shallow head profile that permits a tape configured to pass over the MFS of the head 546 to fly above the head 546 with a spacing of only about 300 nm to about 1 μm without damaging the tape.

The same principles described above for a single head assembly can be applied to a two module head assembly. Thus, the following embodiments focus on various embodiments of a two module head tape assembly.

Figure 6:
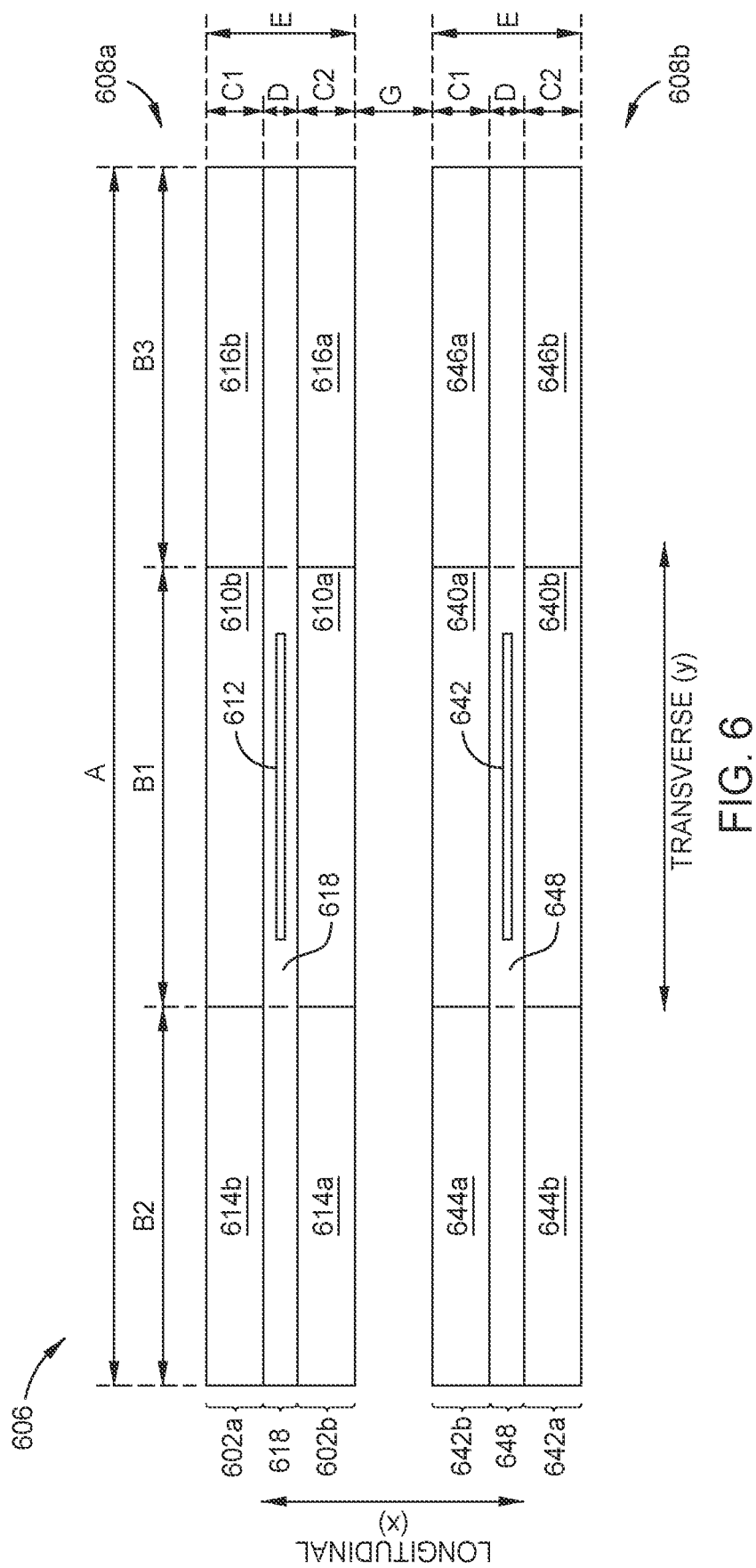
FIG. 6 illustrates a MFS view of a two tape head assembly having beveled corners according to one embodiment.

FIG. 6 illustrates a MFS view of two module head assembly 606. The head assembly 606 may be within a storage device, such as the tape drive 100 of FIG. 1A. The head assembly 606 comprises a first module 608a and a second module 608b, wherein the first module and the second module are identical. The first module and the second module are the same as the head 406 of FIG. 4.

Thus, the first module 608a comprises first layer 602a of a first wafer, a second layer 602b of the first wafer, wherein the second layer 602b is disposed adjacent to the first layer 602a, and a first recording gap 618 disposed between the first layer 602a and the second layer 602b, wherein the first recording gap 618 comprises the first recording element 612. The second module 608b comprises a first layer 642a of a second wafer, a second layer 642b of the second wafer disposed adjacent to the second layer 602b of the first module 608a, wherein the second layer 642b is further disposed adjacent to the first layer 642a, and a second recording gap 648 disposed between the first layer 642a and the second layer 642b of the second module 608b, wherein the second recording gap comprises the second recording element 642. It is to be understood that although the recording gaps 618, 648 are shown as spanning the width A of the head 606, the recording gaps 618, 648 may have a shorter width such that they do not span the width A. As noted previously in FIG. 4, each recording element 612, 642 comprises one or more pairs of writer and/or reader such as the as the writer(s) 236 and the reader(s) 238 of FIG. 2.

The first layer 602a of the first module 608a and the first layer 642a of the second module 608b each has a first length C1 of about 50 μm to about 150 μm in the longitudinal direction. The second layer 602b of the first module 608a and the second layer 642b of the second module 608b each has a second length C2, wherein C2 is equal to C1. The recording gap 618 of the first module 608a and a recording gap 648 of the second module 608b each has a length D of about 20 μm to about 100 μm in the longitudinal direction.

Thus, each of the first module 608a and the second module 608b has a total length E of about 120 μm to about 400 μm in the longitudinal direction. Further, the first module 608a is spaced a distance G apart from the second module 608bm wherein G is about 250 μm to about 450 μm. Thus, the body of the two module head assembly has a total length of about 490 μm to about 1,250 μm in the longitudinal direction.

Figure 7:
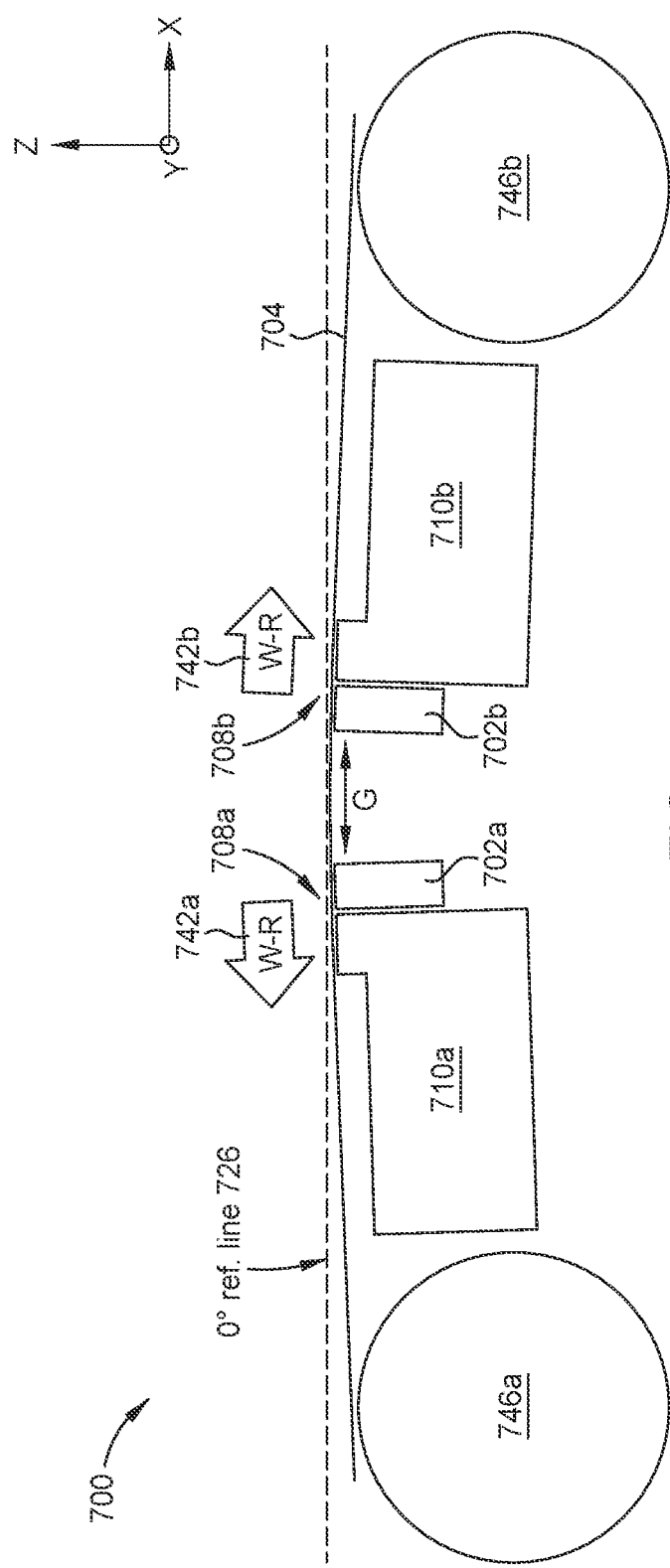
FIG. 7 illustrates a side view of a two tape head assembly having beveled corners according to one embodiment.

FIG. 7 illustrates a side view of a two module tape head assembly having beveled corners according to one embodiment. FIG. 7 illustrates a side view of a head assembly 700 comprising a first module 708a having beveled corners, and a second module 708b having beveled corners. The first module 708a may be the first module 608a of FIG. 6. The second module 708b may be the second module 608b of FIG. 6. The head assembly 700 may be the head 306 of FIG. 3. The head assembly 700 may be within a storage device, such as the tape drive 100 of FIG. 1A.

The first module 708a comprises a first closure 702a, one or more first writers (not shown) disposed adjacent to the first closure 702a, one or more first readers (not shown) disposed adjacent to the one or more first writers, and a first substrate 710a disposed adjacent to the one or more first readers. Each of the one or more first writers and the one or more first readers are disposed on the first substrate 710a. Similarly, the second module 708b comprises a second closure 702b, one or more second writers (not shown) disposed adjacent to the second closure 702b, one or more second readers (not shown) disposed adjacent to the one or more second writers, and a second substrate 710b disposed adjacent to the one or more second readers. Each of the one or more second writers and the one or more second readers are disposed on the second substrate 710b.

In one embodiment, the first module 708a and the second module 708b are arranged in a face-to-face configuration or arrangement such that the first closure 702a of the first module 708a is disposed adjacent to the second closure 702b of the second module 708b. In other words, the first module 708a is a mirror image of the second module 708b, where the second module 708b is a right hand module like that shown in FIG. 7 and the first module 708a is a left hand module. The first module 708a has a first writing and reading direction 742a that is opposite to a second writing and reading direction 742b of the second module 708b.

A MFS of each of the first and second modules 708a, 708b is configured to support a tape 704 or other magnetic media. The tape 704 is configured to move over the first and second modules 708a, 708b using a first guide 746a and a second guide 746b in the x-direction, resulting in the tape being bent or angled downwards from a 0° reference line 726 (e.g., parallel to the x-axis) towards the guides 746a, 746b. Thus, it is important that the corners of the first and second modules 708a, 708b are recessed from the MFS so that the corners do not contact and damage the tape 704.

Similar to the single head assembly 406 of FIG. 4, the curve of the MFS of the first module 708a and the curve of the MFS of the second module 708b can be expressed by the same formula as the single head module (i.e. Xcro*$X^m$+ Ycro)$Y^n$, wherein Xcro is a longitudinal crown height, wherein x is a non-dimensional value between −1 to 1, wherein Ycro is transverse crown height, wherein y is a non-dimensional value between 0.5 to 1.5, wherein m is a first curvature power value between 0 and 3, and wherein n is a second curvature value between 0 and 3). Thus, the shape and height of the longitudinal crown height and the transverse crown height can be altered by changing the distance that the corners of the two head module assembly are recessed from the flat-lapped surface because the distance the corners are recessed from the MFS is equal to −(Xcro+Ycro).

Figure 8A:
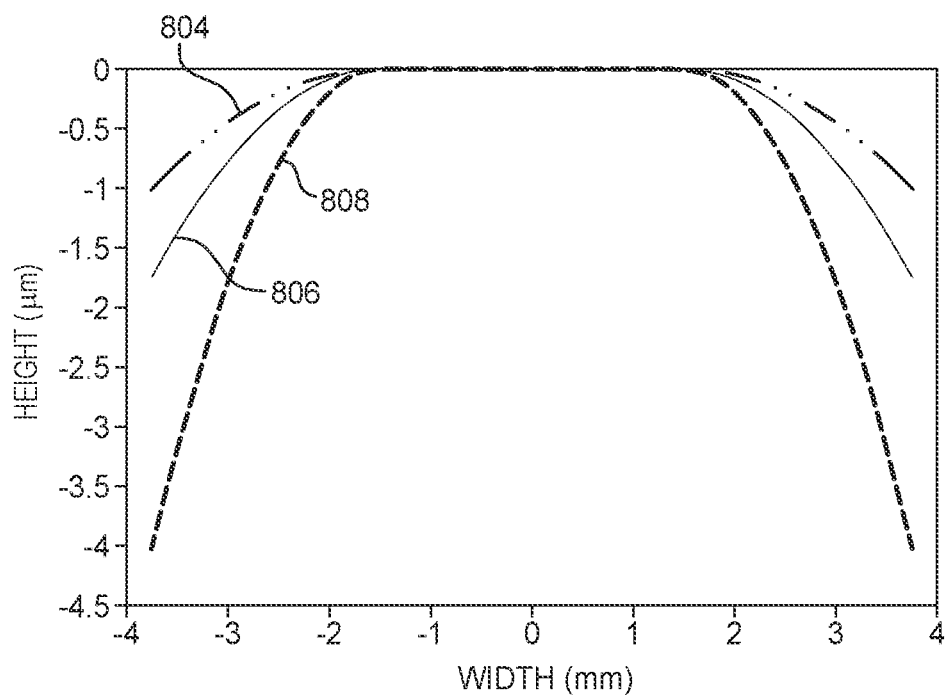
FIG. 8A illustrates transversal crown height vs. width of a two tape head assembly having beveled corners according to various embodiments.
Figure 8B:
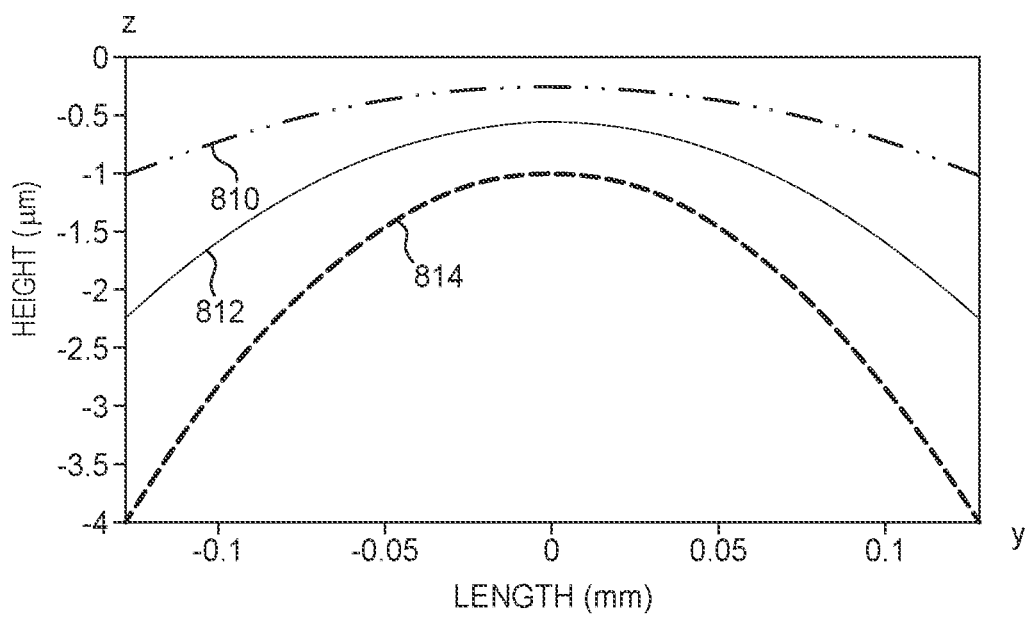
FIG. 8B illustrates longitudinal crown height vs. length of a two tape head assembly having beveled corners according to various embodiments.

Turning to FIGS. 8A and 8B, various end profiles corresponding to one embodiment of a two head assembly with outer corners recessed 4 μm away from a flat-lapped surface of the head are shown. FIG. 8A illustrates transverse crown height vs. width of a two module tape head assembly having beveled corners, wherein the non-dimensional x-value is equal to 1 according to various embodiments. It is to be understood that the width represents the width in millimeters (mm) of an arch connecting outer corners of a head in the transverse direction, such as the first outer corner 424a and the third outer corner 424c of FIG. 5A. It is to be further understood that the height represents the transverse crown height in micrometers (μm) of the arch, wherein the scale of the z-axis has been exaggerated to better illustrate the transverse crown height vs. width.

Height 0 corresponds to a flat-lapped surface of a head disposed at a MFS. Curves 804, 806, and 808 illustrate various profiles along an arch connecting outers corners in the transverse direction (i.e. the width of a head), such as the fourth arch connecting outer corners 424b and 424d of FIG. 5A. Curve 804 illustrates the profile of the arch near the flat-lapped surface of the head, curve 808 illustrates the profile of the arch at the edge of the head, and curve 806 illustrates the profile of the arch between curves 804 and 808. Thus, it can be seen that although the outer corners of the head are recessed from the flat-lapped surface of the head, there is no sharp drop off from the flat-lapped surface to the outer corners. As such, a gradual beveled profile is created, which in turn allows the tape to pass smoothly across the MFS of the head.

FIG. 8B illustrates longitudinal crown height vs. length of a two module tape head assembly having beveled corners, wherein the non-dimensional y-value is equal to 1 according to various embodiments. It is to be understood that the length represents the length in millimeters (mm) of an arch connecting outer corners in the longitudinal direction, such as the first outer corner 424a and the second outer corner 424b of FIG. 5A. It is to be further understood that the height represents the longitudinal crown height of the arch in micrometers (μm) of the arch, wherein the scale of the z-axis has been exaggerated to better illustrate the longitudinal crown height vs. length.

Height 0 corresponds to a flat-lapped surface of a head disposed at a MFS. Curves 810, 812, and 814 illustrate various profiles along an arch connecting outers corners in the longitudinal direction (i.e. the length of a head), such as the first arch connecting outer corners 424a and 424c of FIG. 5A. Curve 810 illustrates the profile of the arch near the flat-lapped surface of the head, curve 814 illustrates the profile of the arch at the edge of the head, and curve 812 illustrates the profile of the arch between curves 810 and 814. Thus, it can be seen that although the outer corners of the head are recessed from the flat-lapped surface of the head, there is no sharp drop off from the flat-lapped surface to the outer corners. As such, a gradual beveled profile is created, which in turn allows the tape to pass smoothly across the MFS of the head.

By designing a head assembly with corners recessed from a MFS by about 1 μm to about 10 μm, a smooth head profile can be achieved, which permits a tape to fly above the head with minimal spacing without damaging the tape, thereby improving read/write performance.

In one embodiment, a tape head, comprising: a tape head body having a curved surface disposed at a media facing surface (MFS), wherein the curved surface comprises: a flat-lapped surface; and a first beveled wing extending from the flat-lapped surface, wherein the first beveled wing includes a first corner and a second corner, wherein the first corner and the second corner are connected by a first arched edge.

The tape head, wherein the flat-lapped surface has a first width of about 2 millimeters (mm) to about 4 mm. The tape head, wherein the curved surface further comprises a second beveled wing extending from the flat-lapped surface, wherein the second beveled wing includes a third corner and a fourth corner, wherein the third corner and the fourth corner are connect by a second arched edge. The tape head, wherein the first beveled wing has a second width of about 2 mm to about 3 mm, and wherein the second beveled wing has a third width equal to the second width. The tape head, wherein: the flat-lapped surface comprises a recording gap comprising a recording element, wherein the recording gap has a length of about 20 micrometers (μm) to about 100 μm. The tape head, wherein the first beveled wing has a fifth corner and a sixth corner; the fifth corner and the sixth corner are disposed adjacent to the flat-lapped surface at the MFS; and each of the fifth corner and the sixth corner are spaced about 0.1 mm to about 3.5 mm away from the recording elements. The tape head, wherein a curve of the curved surface is equal to $(XcroX^m+Ycro)Y^n$, wherein Xcro is a longitudinal crown height, wherein x is a non-dimensional value between −1 to 1, wherein Ycro is transverse crown height, wherein y is a non-dimensional value between 0.5 to 1.5, wherein m is a first curvature power value between 2 and 3, and wherein n is a second curvature value between 1.5 and 3. The tape head, wherein: the first corner is recessed a first distance away from a top surface of the flat-lapped surface, the second corner is recessed a second distance away from the top surface of the flat-lapped surface, the first distance equals about 1 micrometer (μm) about 4 μm, andthe second distance is equal to the first distance. The tape head, wherein: the first distance is equal to −(Xcro+Ycro), Xcro is a longitudinal crown height, and Ycro is transverse crown height. The tape head, wherein the first beveled wing has a slope of about 0.02 degrees)(°) to about 0.2°. A tape drive comprising the tape head of claim 1. The tape drive of claim 9 comprising a magnetic media, wherein the magnetic media has a fourth width, and wherein the tape head has a fifth width less than the fourth width.

In another embodiment, tape head assembly comprising: a first module comprising: a first substrate; and a first curved surface disposed on the first substrate, wherein the first curved surface comprises: a first portion disposed in contact with a media facing surface (MFS); and a second portion recessed from a top surface of the first portion; and a second module comprising: a second substrate; and a second curved surface disposed on the second substrate, wherein the second curved surface comprises: a third portion disposed in contact with the MFS; and a second portion recessed from a top portion of the third portion, wherein the first curved surface is spaced a first distance away from the second curved surface, wherein the first distance is parallel to the MFS.

The tape head assembly, wherein the first distance is about 250 micrometers (μm) to about 450 μm. The tape head assembly, wherein the first module is angled about 1 degree) (°) away from the MFS, and wherein the second module is angled about 1° away from the MFS. The tape head assembly, having a length of about 490 micrometers (μm) to about 1,250 μm. A tape drive comprising the tape head assembly.

In yet another embodiment, a tape head, comprising: a tape head body having a curved surface disposed at a media facing surface (MFS), wherein the curved surface comprises: a first layer having a first end and a second end each extending from a flat central portion, wherein each of the first end and the second end are arched; a second portion, wherein the second portion is identical to the first portion; and a recording gap disposed between the first portion and the second portion.

The tape head, wherein the tape head body has a width of about 6 millimeters (mm) to about 10 mm. The tape head, wherein the tape head body has a length of about 120 micrometers (μm) to about 340 μm. A tape drive comprising the tape head.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
   a tape head body having a curved surface disposed at a media facing surface (MFS), wherein the curved surface comprises:
   a flat-lapped surface; and
   a first beveled wing extending from the flat-lapped surface, wherein the first beveled wing includes a first corner and a second corner, wherein the first corner and the second corner are connected by a first arched edge,
   wherein a curve of the curved surface is equal to $(XcroX^m+Ycro)Y^n$, wherein Xcro is a longitudinal crown height, wherein x is a non-dimensional value between −1 to 1, wherein Ycro is transverse crown height, wherein y is a non-dimensional value between 0.5 to 1.5, wherein m is a first curvature power value between 2 and 3, and wherein n is a second curvature value between 1.5 and 3.

2. The tape head of claim 1, wherein the flat-lapped surface has a first width of about 2 millimeters (mm) to about 4 mm.

3. The tape head of claim 1, wherein the curved surface further comprises a second beveled wing extending from the flat-lapped surface, wherein the second beveled wing includes a third corner and a fourth corner, wherein the third corner and the fourth corner are connected by a second arched edge.

4. The tape head of claim 3, wherein the first beveled wing has a second width of about 2 mm to about 3 mm, and wherein the second beveled wing has a third width equal to the second width.

5. The tape head of claim 1, wherein the flat-lapped surface comprises a recording gap comprising a recording element, wherein the recording gap has a length of about 20 micrometers (μm) to about 100 μm.

6. The tape head of claim 5, wherein
   the first beveled wing has a fifth corner and a sixth corner;
   the fifth corner and the sixth corner are disposed adjacent to the flat-lapped surface at the MFS; and
   each of the fifth corner and the sixth corner are spaced about 0.1 mm to about 3.5 mm away from the recording element.

7. The tape head of claim 1, wherein:
   the first corner is recessed a first distance away from a top surface of the flat-lapped surface,
   the second corner is recessed a second distance away from the top surface of the flat-lapped surface,
   the first distance equals about 1 micrometer (μm) to about 4 μm, and
   the second distance is equal to the first distance.

8. The tape head of claim 7 wherein:
   the first distance is equal to −(Xcro+Ycro),
   Xcro is a longitudinal crown height, and
   Ycro is transverse crown height.

9. The tape head of claim 1, wherein the first beveled wing has a slope of about 0.02 degrees)(°) to about 0.2°.

10. A tape drive comprising the tape head of claim 1.

11. The tape drive of claim 10, comprising a magnetic media, wherein the magnetic media has a fourth width, and wherein the tape head has a fifth width less than the fourth width.

12. A tape head assembly, comprising:
   a first module comprising:
      a first substrate; and
      a first curved surface disposed on the first substrate, wherein the first curved surface comprises:
         a first portion disposed in contact with a media facing surface (MFS); and
         a second portion recessed from a top surface of the first portion; and
   a second module comprising:
      a second substrate; and
      a second curved surface disposed on the second substrate, wherein the second curved surface comprises:
         a third portion disposed in contact with the MFS; and
         a second portion recessed from a top surface of the third portion, wherein:
      the first curved surface is spaced a first distance away from the second curved surface,
      the first distance is parallel to the MFS, and
      a curve of each of the first curved surface and the second curved surface is equal to $(XcroX^m+Ycro)Y^n$, where Xcro is a longitudinal crown height, where x is a non-dimensional value between −1 to 1, where Ycro is transverse crown height, where y is a non-dimensional value between 0.5 to 1.5, where m is a first curvature power value between 2 and 3, and where n is a second curvature value between 1.5 and 3.

13. The tape head assembly of claim 12, wherein the first distance is about 250 micrometers (μm) to about 450 μm.

14. The tape head assembly of claim 12, wherein the tape head assembly has a length of about 490 micrometers (μm) to about 1,250 μm.

15. A tape drive comprising the tape head assembly of claim 12.

16. A tape head, comprising:
   a tape head body having a curved surface disposed at a media facing surface (MFS), wherein the curved surface comprises:
      a first layer having a first end and a second end each extending from a flat central portion, wherein each of the first end and the second end are arched;
      a second layer, wherein the second layer is identical to the first layer; and
      a recording gap disposed between the first layer and the second layer,
   wherein a curve of the curved surface is equal to $(XcroX^m+Ycro)Y^n$, where Xcro is a longitudinal crown height, where x is a non-dimensional value between −1 to 1, where Ycro is transverse crown height, where y is a non-dimensional value between 0.5 to 1.5, where m is a first curvature power value between 2 and 3, and where n is a second curvature value between 1.5 and 3.

17. The tape head of claim 16, wherein the tape head body has a width of about 6 millimeters (mm) to about 10 mm.

18. The tape head of claim 16, wherein the tape head body has a length of about 120 micrometers (μm) to about 400 μm.

19. A tape drive comprising the tape head of claim 16.

* * * * *